(12) United States Patent
Meler et al.

(10) Patent No.: US 10,616,482 B2
(45) Date of Patent: Apr. 7, 2020

(54) IMAGE QUALITY ASSESSMENT

(71) Applicant: GoPro, Inc., San Mateo, CA (US)

(72) Inventors: Antoine Meler, Chapareillan (FR); Bruno Cesar Douady-Pleven, Bures-sur-Yvette (FR)

(73) Assignee: GoPro, Inc., San Mateo, CA (US)

( * ) Notice: Subject to any disclaimer, the term of this patent is extended or adjusted under 35 U.S.C. 154(b) by 51 days.

(21) Appl. No.: 15/455,446

(22) Filed: Mar. 10, 2017

(65) Prior Publication Data
US 2018/0262683 A1 Sep. 13, 2018

(51) Int. Cl.
| | |
|---|---|
| *H04N 5/232* | (2006.01) |
| *H04N 5/247* | (2006.01) |
| *H04N 5/265* | (2006.01) |
| *G06T 7/13* | (2017.01) |
| *G06T 7/70* | (2017.01) |
| *G06T 3/40* | (2006.01) |

(52) U.S. Cl.
CPC ....... *H04N 5/23238* (2013.01); *G06T 3/4038* (2013.01); *G06T 7/13* (2017.01); *G06T 7/70* (2017.01); *H04N 5/247* (2013.01); *H04N 5/265* (2013.01); *G06T 2207/20081* (2013.01)

(58) Field of Classification Search
None
See application file for complete search history.

(56) References Cited

U.S. PATENT DOCUMENTS

| | | |
|---|---|---|
| 8,890,954 B2 | 11/2014 | Odonnell |
| 2010/0014780 A1 | 1/2010 | Kalayeh |
| 2010/0097444 A1* | 4/2010 | Lablans ............... G03B 35/00 348/46 |
| 2010/0271511 A1* | 10/2010 | Ma ..................... H04N 13/0011 348/239 |
| 2015/0065803 A1* | 3/2015 | Douglas ............. A61B 1/00009 600/200 |

(Continued)

FOREIGN PATENT DOCUMENTS

TW     I555379 B     5/2017

OTHER PUBLICATIONS

PCT International Search Report and Written Opinion for PCT/US2017/068239 dated Feb. 28, 2018, 16 pgs.

(Continued)

*Primary Examiner* — Pankaj Kumar
*Assistant Examiner* — Charles N Hicks
(74) *Attorney, Agent, or Firm* — Young Basile Hanlon & MacFarlane, P.C.

(57) ABSTRACT

Systems and methods are disclosed for image signal processing. For example, methods may include receiving a first image from a first image sensor; receiving a second image from a second image sensor; stitching the first image and the second image to obtain a stitched image; identifying an image portion of the stitched image that is positioned on a stitching boundary of the stitched image; and inputting the image portion to a machine learning module to obtain a score, wherein the machine learning module has been trained using training data that included image portions labeled to reflect an absence of stitching and image portions labeled to reflect a presence of stitching, wherein the image portions labeled to reflect a presence of stitching included stitching.

18 Claims, 8 Drawing Sheets

(56) References Cited

U.S. PATENT DOCUMENTS

2017/0004622 A1 1/2017 Adsumilli
2017/0134713 A1 5/2017 Lin

OTHER PUBLICATIONS

Li Jing et al, "Efficient Video Stitching Based on Fast Structure Deformation", IEEE Transactions on Cybernetics, IEEE, Piscataway, NJ, USA, vol. 45, No. 12, Dec. 1, 2015 (Dec. 1, 2015), pp. 2707-2719, XP011589985, ISSN: 2168-22667, DOI: 10.1109/TCYB.2014.2381774 [retrieved on Nov. 13, 2015].

Zhang Fan et al, "Parallax-Tolerant Image Stitching", 2014 IEEE Conference on Computer Vision and Pattern Recognition, IEEE, Jun. 23, 2014 (Jun. 23, 2014), pp. 3262-3269, XP032649126, DOI: 10.1109/CVPR.2014.423 [retrieved on Sep. 24, 2014].

PCT International Preliminary Report on Patentability for PCT/US2017/068239, dated Sep. 19 2019, 12 pages.

Leorin et al., "Quality Assessment of Panorama Video for Videoconferencing Applications," 2005 IEEE 7th Workshop on Multimedia Signal Processing, Nov. 2005, 4 pages.

Chau et al., "Robust Panoramic Image Stitching," CS231A Final Report, 2014/2015 Winter term/semester at Stanford, accessed on Jan. 4, 2017, 6 pages.

Kang et al., "Convolutional Neural Networks for No-Reference Image Quality Assessment," 2014 IEEE Conference on Computer Vision and Pattern Recognition, Jun. 2014, 8 pages.

Bianco et al., "On the Use of Deep Learning for Blind Image Quality Assessment," arXiv:1602.05531v5 [cs.CV], Apr. 4, 2017, 8 pages.

\* cited by examiner

IMAGE QUALITY ASSESSMENT

TECHNICAL FIELD

This disclosure relates to image quality assessment.

BACKGROUND

Image capture devices, such as cameras, may capture content as images or video. Light may be received and focused via a lens and may be converted to an electronic image signal by an image sensor. The image signal may be processed by an image signal processor (ISP) to form an image, which may be stored and/or encoded. In some implementations, multiple images or video frames from different image sensors may include spatially adjacent or overlapping content, which may be stitched together to form a larger image with a larger field of view. The image stitching process may introduce distortions that depend on the objects appearing within the field of view of the camera and/or the relative positions and orientations of those objects.

SUMMARY

Disclosed herein are implementations of image quality assessment.

In a first aspect, the subject matter described in this specification can be embodied in systems that include a first image sensor configured to capture a first image and a second image sensor configured to capture a second image. The systems include a processing apparatus that is configured to receive the first image from the first image sensor; receive the second image from the second image sensor; stitch the first image and the second image to obtain a stitched image; identify an image portion of the stitched image that is positioned on a stitching boundary of the stitched image; input the image portion to a machine learning module to obtain a score, wherein the machine learning module has been trained using training data that included image portions labeled to reflect an absence of stitching and image portions labeled to reflect a presence of stitching, wherein the image portions labeled to reflect a presence of stitching included stitching boundaries of stitched images; select a parameter of a stitching algorithm based at least in part on the score; stitch, using the parameter, the first image and the second image to obtain a composite image; and store, display, or transmit an output image based on the composite image.

In a second aspect, the subject matter described in this specification can be embodied in methods that include receiving a first image from a first image sensor; receiving a second image from a second image sensor; stitching the first image and the second image to obtain a stitched image; identifying an image portion of the stitched image that is positioned on a stitching boundary of the stitched image; and inputting the image portion to a machine learning module to obtain a score, wherein the machine learning module has been trained using training data that included image portions labeled to reflect an absence of stitching and image portions labeled to reflect a presence of stitching, wherein the image portions labeled to reflect a presence of stitching included stitching boundaries of stitched images.

In a third aspect, the subject matter described in this specification can be embodied in methods that include presenting images to humans; receiving scores for the images from the humans; training a machine learning module with training data that includes image portions from the images labeled with the scores for the images from the humans; and inputting an image portion from a first image to the trained machine learning module to obtain an estimate of quality of the first image.

These and other aspects of the present disclosure are disclosed in the following detailed description, the appended claims, and the accompanying figures.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
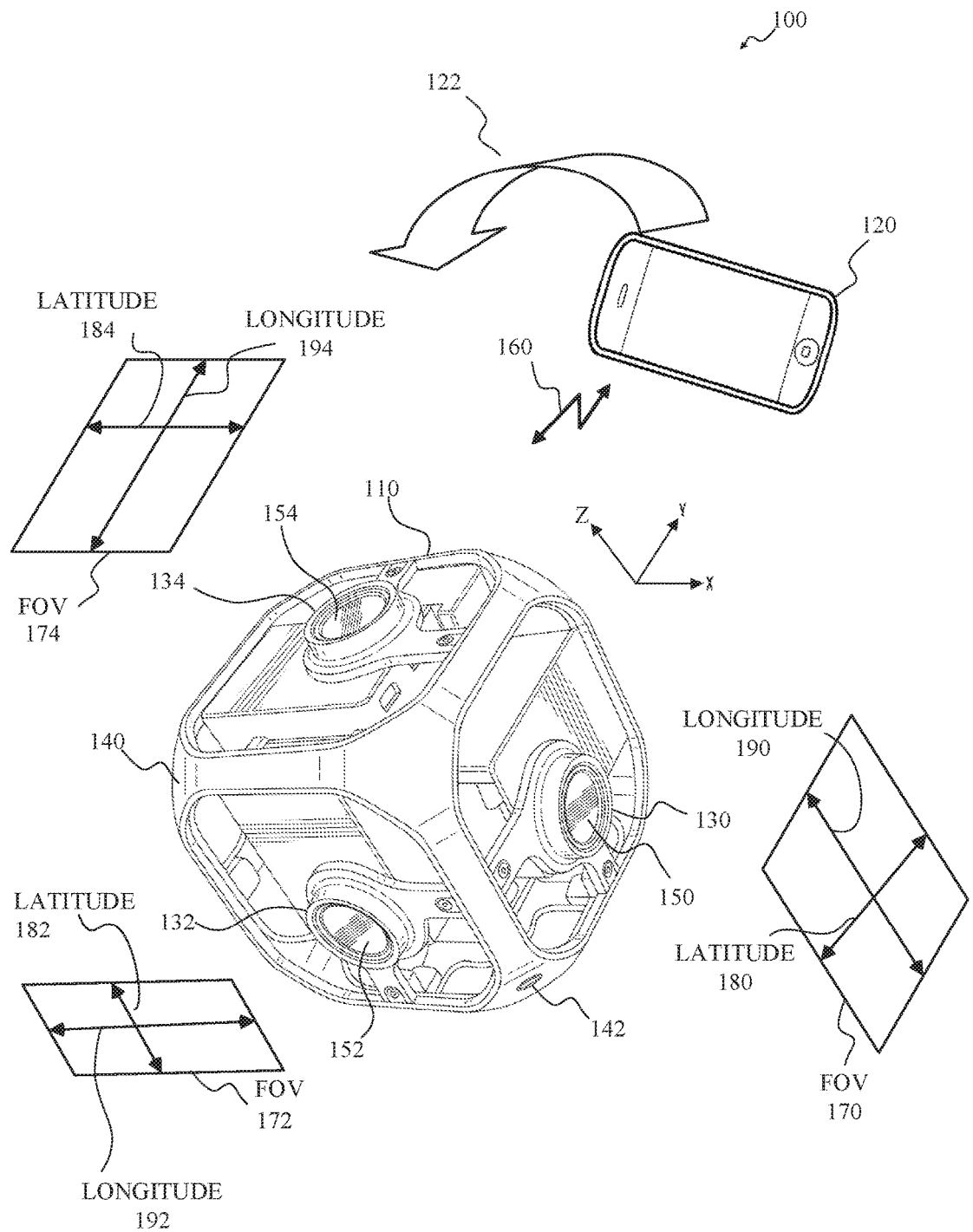
FIG. 1 is a diagram of an example of an image capture system for content capture.

This document includes disclosure of systems, apparatus, and methods for image quality assessment to enable enhancement of the quality of images generated by image capture systems. For example, some image capture systems include multiple (e.g., two or six) image sensors and generate composite images by stitching images from two or more sensors together. Stitching may be a dynamic, data-dependent operation that may introduce distortions into the resulting composite image. For example, a slight misalignment of pixels from two images being stitched can result in discontinuities (e.g., lines at which color changes abruptly) in the composite, stitched image, which can be quite noticeable to humans and significantly degrade image quality. When designing and/or applying processes for stitching or other image processing, it is useful to be able to consistently assess image quality to provide feedback that enables those processes to be adjusted (e.g., in real-time during image capture processing or in a laboratory where image capture systems are being designed) to improve image quality.

Stitching is a process of combining images with overlapping fields of view to produce a composite image (e.g., to form a panoramic image). Stitching may include aligning the pixels of two images being combined in a region (which may be called a seam) along a boundary between sections of a composite image that are respectively based on two different input images—called a stitching boundary. For example, stitching may include applying parallax correction (e.g., binocular disparity correction) to align pixels corresponding to objects appearing in the fields of view of multiple image sensors. For example, because the binocular disparity depends on the distance of an object from the image sensors, the stitching process may be data dependent in the sense that it utilizes image data reflecting positions of objects in the fields of view of the sensors during the capture of a particular image (e.g., a particular frame of video) to determine the mappings of pixels from input images to a composite image. It may be advantageous to have a consistent assessment of image quality available at the time a composite image is being captured and encoded so that parameters (e.g., the number of dimensions considered) of a stitching process may be adjusted to best suit a current scene.

The quality of stitching in an image may be assessed by inputting portions (e.g., blocks of pixels) of a stitched image from along the stitching boundary to a machine learning module that has been trained to distinguish between portions of image data from a single image sensor and portions of data that have been stitched. For example, the machine learning module (e.g., a convolutional neural network or a support vector machine) may be trained with two sets of data. The first set of data includes image portions that consist of pixels captured with a single image sensor and are labeled with a score (e.g., 1) corresponding to non-seam image portions. The second set of training includes image portions that include pixels based on pixels from at least two different images (captured with different image sensors) that have been stitched together. Portions of data in the second set of training data may be labeled with a score (e.g., 0) corresponding to seam image portions. When new composite (e.g., panoramic) images are stitched, portions of data from along the stitching boundary may be input to the trained machine learning module to obtain a score reflecting a prediction (e.g., an estimated probability) that the portion is from a stitched seam. A score close to the score for non-seam data may indicate high quality stitching in the portion. A score close to the score for seam data may indicate low quality stitching in the portion. In some implementations, scores for multiple portions from along the stitching boundary are determined and combined (e.g., averaged) to determine an estimate of the quality of the stitching of the composite image. For example, this estimate of stitching quality for the image may be used as feedback to determine whether and/or how to adjust a parameter of a stitching algorithm to improve the image quality of a composite image.

It may also be useful to have automatically determined image quality scores that correlate well with subjective human assessments of image quality. Machine learning modules may be trained with image data that has been labeled with image quality scores provided by humans. A machine learning module trained in this manner may be configured to take image data (e.g., a portion of the pixels in an image) as input and output an image quality score that correlates well with subjective human scores. For example, images may be presented to humans and image quality scores for those images may be received from the humans and used to label one or more portions of image data from the respective images. For example, the labeled image data may be used to train a neural network (e.g., a convolutional neural network).

Implementations are described in detail with reference to the drawings, which are provided as examples so as to enable those skilled in the art to practice the technology. The figures and examples are not meant to limit the scope of the present disclosure to a single implementation or embodiment, and other implementations and embodiments are possible by way of interchange of, or combination with, some or all of the described or illustrated elements. Wherever convenient, the same reference numbers will be used throughout the drawings to refer to same or like parts.

FIG. 1 is a diagram of an example of an image capture system 100 for content capture. As shown in FIG. 1, an image capture system 100 may include an image capture apparatus 110, an external user interface (UI) device 120, or a combination thereof.

In some implementations, the image capture apparatus 110 may be a multi-face apparatus and may include multiple image capture devices, such as image capture devices 130, 132, 134 as shown in FIG. 1, arranged in a structure 140, such as a cube-shaped cage as shown. Although three image capture devices 130, 132, 134 are shown for simplicity in FIG. 1, the image capture apparatus 110 may include any number of image capture devices. For example, the image capture apparatus 110 shown in FIG. 1 may include six cameras, which may include the three image capture devices 130, 132, 134 shown and three cameras not shown.

In some implementations, the structure 140 may have dimensions, such as between 25 mm and 150 mm. For example, the length of each side of the structure 140 may be 105 mm. The structure 140 may include a mounting port 142, which may be removably attachable to a supporting structure, such as a tripod, a photo stick, or any other camera mount (not shown). The structure 140 may be a rigid support structure, such that the relative orientation of the image capture devices 130, 132, 134 of the image capture apparatus 110 may be maintained in relatively static or fixed alignment, except as described herein.

The image capture apparatus 110 may obtain, or capture, image content, such as images, video, or both, with a 360° field-of-view, which may be referred to herein as panoramic or spherical content. For example, each of the image capture devices 130, 132, 134 may include respective lenses, for receiving and focusing light, and respective image sensors for converting the received and focused light to an image signal, such as by measuring or sampling the light, and the multiple image capture devices 130, 132, 134 may be arranged such that respective image sensors and lenses capture a combined field-of-view characterized by a spherical or near spherical field-of-view.

In some implementations, each of the image capture devices 130, 132, 134 may have a respective field-of-view 170, 172, 174, such as a field-of-view 170, 172, 174 that 90° in a lateral dimension 180, 182, 184 and includes 120° in a longitudinal dimension 190, 192, 194. In some implementations, image capture devices 130, 132, 134 having overlapping fields-of-view 170, 172, 174, or the image sensors thereof, may be oriented at defined angles, such as at 90°, with respect to one another. In some implementations, the image sensor of the image capture device 130 is directed along the X axis, the image sensor of the image capture device 132 is directed along the Y axis, and the image sensor of the image capture device 134 is directed along the Z axis. The respective fields-of-view 170, 172, 174 for adjacent image capture devices 130, 132, 134 may be oriented to allow overlap for a stitching function. For example, the longitudinal dimension 190 of the field-of-view 170 for the image capture device 130 may be oriented at 90° with respect to the latitudinal dimension 184 of the field-of-view 174 for the image capture device 134, the latitudinal dimension 180 of the field-of-view 170 for the image capture device 130 may be oriented at 90° with respect to the longitudinal dimension 192 of the field-of-view 172 for the image capture device 132, and the latitudinal dimension 182 of the field-of-view 172 for the image capture device 132 may be oriented at 90° with respect to the longitudinal dimension 194 of the field-of-view 174 for the image capture device 134.

The image capture apparatus 110 shown in FIG. 1 may have 420° angular coverage in vertical and/or horizontal planes by the successive overlap of 90°, 120°, 90°, 120° respective fields-of-view 170, 172, 174 (not all shown) for four adjacent image capture devices 130, 132, 134 (not all shown). For example, fields-of-view 170, 172 for the image capture devices 130, 132 and fields-of-view (not shown) for two image capture devices (not shown) opposite the image capture devices 130, 132 respectively may be combined to provide 420° angular coverage in a horizontal plane. In some implementations, the overlap between fields-of-view of image capture devices 130, 132, 134 having a combined field-of-view including less than 360° angular coverage in a vertical and/or horizontal plane may be aligned and merged or combined to produce a panoramic image. For example, the image capture apparatus 110 may be in motion, such as rotating, and source images captured by at least one of the image capture devices 130, 132, 134 may be combined to form a panoramic image. As another example, the image capture apparatus 110 may be stationary, and source images captured contemporaneously by each image capture device 130, 132, 134 may be combined to form a panoramic image.

In some implementations, an image capture device 130, 132, 134 may include a lens 150, 152, 154 or other optical element. An optical element may include one or more lens, macro lens, zoom lens, special-purpose lens, telephoto lens, prime lens, achromatic lens, apochromatic lens, process lens, wide-angle lens, ultra-wide-angle lens, fisheye lens, infrared lens, ultraviolet lens, perspective control lens, other lens, and/or other optical element. In some implementations, a lens 150, 152, 154 may be a fisheye lens and produce fisheye, or near-fisheye, field-of-view images. For example, the respective lenses 150, 152, 154 of the image capture devices 130, 132, 134 may be fisheye lenses. In some implementations, images captured by two or more image capture devices 130, 132, 134 of the image capture apparatus 110 may be combined by stitching or merging fisheye projections of the captured images to produce an equirectangular planar image. For example, a first fisheye image may be a round or elliptical image, and may be transformed to a first rectangular image, a second fisheye image may be a round or elliptical image, and may be transformed to a second rectangular image, and the first and second rectangular images may be arranged side-by-side, which may include overlapping, and stitched together to form the equirectangular planar image.

Although not expressly shown in FIG. 1, In some implementations, an image capture device 130, 132, 134 may include one or more image sensors, such as a charge-coupled device (CCD) sensor, an active pixel sensor (APS), a complementary metal-oxide semiconductor (CMOS) sensor, an N-type metal-oxide-semiconductor (NMOS) sensor, and/or any other image sensor or combination of image sensors.

Although not expressly shown in FIG. 1, In some implementations, an image capture apparatus 110 may include one or more microphones, which may receive, capture, and record audio information, which may be associated with images acquired by the image sensors.

Although not expressly shown in FIG. 1, the image capture apparatus 110 may include one or more other information sources or sensors, such as an inertial measurement unit (IMU), a global positioning system (GPS) receiver component, a pressure sensor, a temperature sensor, a heart rate sensor, or any other unit, or combination of units, that may be included in an image capture apparatus.

In some implementations, the image capture apparatus 110 may interface with or communicate with an external device, such as the external user interface (UI) device 120, via a wired (not shown) or wireless (as shown) computing communication link 160. Although a single computing communication link 160 is shown in FIG. 1 for simplicity, any number of computing communication links may be used. Although the computing communication link 160 shown in FIG. 1 is shown as a direct computing communication link, an indirect computing communication link, such as a link including another device or a network, such as the internet, may be used. In some implementations, the computing communication link 160 may be a Wi-Fi link, an infrared link, a Bluetooth (BT) link, a cellular link, a ZigBee link, a near field communications (NFC) link, such as an ISO/IEC 23243 protocol link, an Advanced Network Technology interoperability (ANT+) link, and/or any other wireless communications link or combination of links. In some implementations, the computing communication link 160 may be an HDMI link, a USB link, a digital video interface link, a display port interface link, such as a Video Electronics Standards Association (VESA) digital display interface link, an Ethernet link, a Thunderbolt link, and/or other wired computing communication link.

In some implementations, the user interface device 120 may be a computing device, such as a smartphone, a tablet computer, a phablet, a smart watch, a portable computer, and/or another device or combination of devices configured to receive user input, communicate information with the image capture apparatus 110 via the computing communication link 160, or receive user input and communicate information with the image capture apparatus 110 via the computing communication link 160.

In some implementations, the image capture apparatus 110 may transmit images, such as panoramic images, or portions thereof, to the user interface device 120 via the computing communication link 160, and the user interface device 120 may store, process, display, or a combination thereof the panoramic images.

In some implementations, the user interface device 120 may display, or otherwise present, content, such as images or video, acquired by the image capture apparatus 110. For example, a display of the user interface device 120 may be a viewport into the three-dimensional space represented by the panoramic images or video captured or created by the image capture apparatus 110.

In some implementations, the user interface device 120 may communicate information, such as metadata, to the image capture apparatus 110. For example, the user interface device 120 may send orientation information of the user interface device 120 with respect to a defined coordinate system to the image capture apparatus 110, such that the image capture apparatus 110 may determine an orientation of the user interface device 120 relative to the image capture apparatus 110. Based on the determined orientation, the image capture apparatus 110 may identify a portion of the panoramic images or video captured by the image capture apparatus 110 for the image capture apparatus 110 to send to the user interface device 120 for presentation as the viewport. In some implementations, based on the determined orientation, the image capture apparatus 110 may determine the location of the user interface device 120 and/or the dimensions for viewing of a portion of the panoramic images or video.

In an example, a user may rotate (sweep) the user interface device 120 through an arc or path 122 in space, as indicated by the arrow shown at 122 in FIG. 1. The user interface device 120 may communicate display orientation information to the image capture apparatus 110 using a communication interface such as the computing communication link 160. The image capture apparatus 110 may provide an encoded bitstream to enable viewing of a portion of the panoramic content corresponding to a portion of the environment of the display location as the image capture apparatus 110 traverses the path 122. Accordingly, display orientation information from the user interface device 120 may be transmitted to the image capture apparatus 110 to control user selectable viewing of captured images and/or video.

In some implementations, the image capture apparatus 110 may communicate with one or more other external devices (not shown) via wired or wireless computing communication links (not shown).

In some implementations, data, such as image data, audio data, and/or other data, obtained by the image capture apparatus 110 may be incorporated into a combined multimedia stream. For example, the multimedia stream may include a video track and/or an audio track. As another example, information from various metadata sensors and/or sources within and/or coupled to the image capture apparatus 110 may be processed to produce a metadata track associated with the video and/or audio track. The metadata track may include metadata, such as white balance metadata, image sensor gain metadata, sensor temperature metadata, exposure time metadata, lens aperture metadata, bracketing configuration metadata and/or other parameters. In some implementations, a multiplexed stream may be generated to incorporate a video and/or audio track and one or more metadata tracks.

In some implementations, the user interface device 120 may implement or execute one or more applications, such as GoPro Studio, GoPro App, or both, to manage or control the image capture apparatus 110. For example, the user interface device 120 may include an application for controlling camera configuration, video acquisition, video display, or any other configurable or controllable aspect of the image capture apparatus 110.

In some implementations, the user interface device 120, such as via an application (e.g., GoPro App), may generate and share, such as via a cloud-based or social media service, one or more images, or short video clips, such as in response to user input.

In some implementations, the user interface device 120, such as via an application (e.g., GoPro App), may remotely control the image capture apparatus 110, such as in response to user input.

In some implementations, the user interface device 120, such as via an application (e.g., GoPro App), may display unprocessed or minimally processed images or video captured by the image capture apparatus 110 contemporaneously with capturing the images or video by the image capture apparatus 110, such as for shot framing, which may be referred to herein as a live preview, and which may be performed in response to user input.

In some implementations, the user interface device 120, such as via an application (e.g., GoPro App), may mark one or more key moments contemporaneously with capturing the images or video by the image capture apparatus 110, such as with a HiLight Tag, such as in response to user input.

In some implementations, the user interface device 120, such as via an application (e.g., GoPro App), may display, or otherwise present, marks or tags associated with images or video, such as HiLight Tags, such as in response to user input. For example, marks may be presented in a GoPro Camera Roll application for location review and/or playback of video highlights.

In some implementations, the user interface device 120, such as via an application (e.g., GoPro App), may wirelessly control camera software, hardware, or both. For example, the user interface device 120 may include a web-based graphical interface accessible by a user for selecting a live or previously recorded video stream from the image capture apparatus 110 for display on the user interface device 120.

In some implementations, the user interface device 120 may receive information indicating a user setting, such as an image resolution setting (e.g., 3840 pixels by 2160 pixels), a frame rate setting (e.g., 60 frames per second (fps)), a location setting, and/or a context setting, which may indicate an activity, such as mountain biking, in response to user input, and may communicate the settings, or related information, to the image capture apparatus 110.

Figure 2:
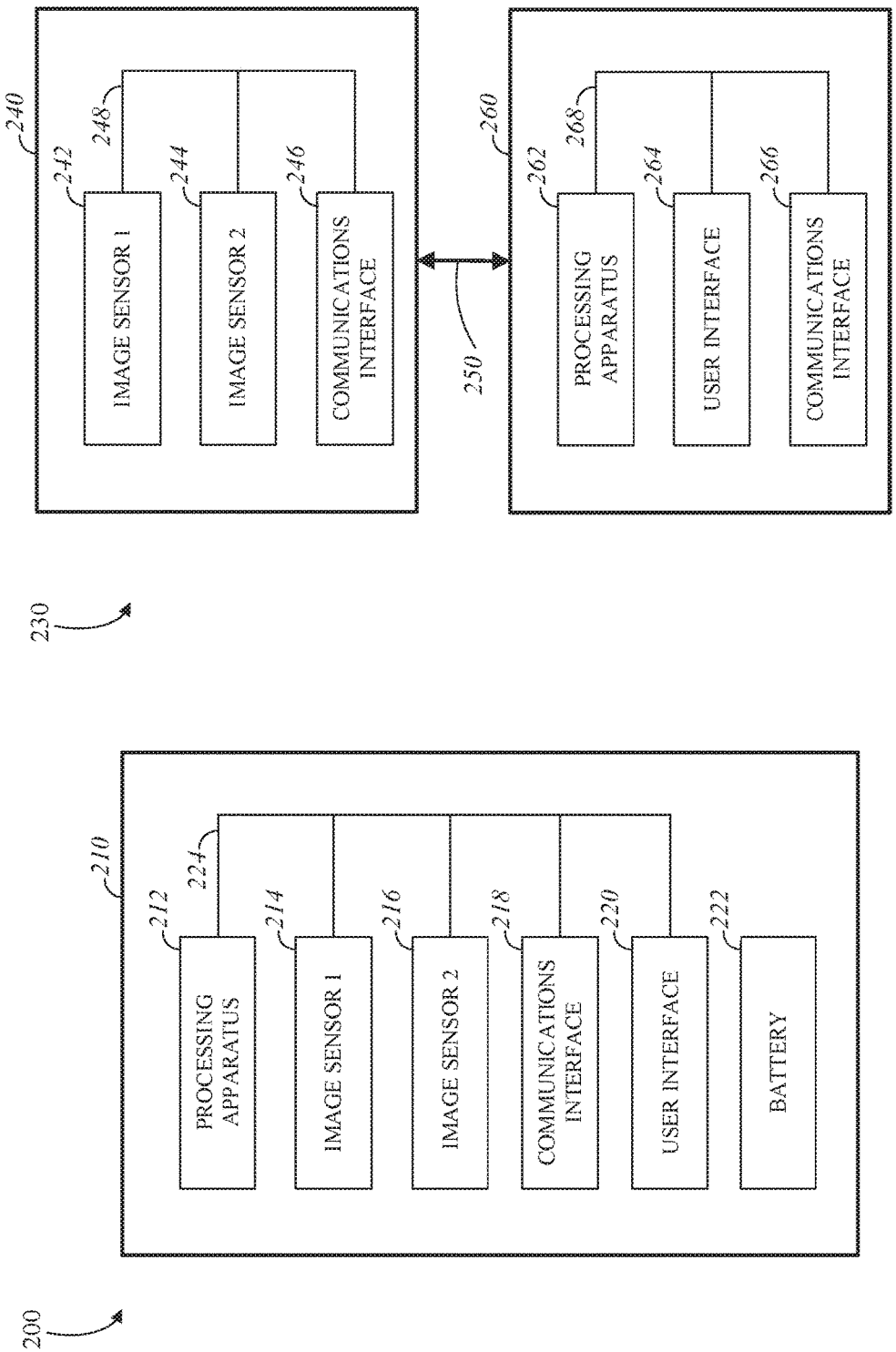
FIG. 2A is a block diagram of an example system configured for image capture and stitching.
FIG. 2B is a block diagram of an example system configured for image capture and stitching.

FIG. 2A is a block diagram of an example system 200 configured for image capture and stitching. The system 200 includes an image capture device 210 (e.g., a camera or a drone) that includes a processing apparatus 212 that is configured to receive a first image from the first image sensor 214 and receive a second image from the second image sensor 216. The processing apparatus 212 may be configured to perform image signal processing (e.g., filtering, stitching, and/or encoding) to generated composite images based on image data from the image sensors 214 and 216. The image capture device 210 includes a communications interface 218 for transferring images to other devices. The image capture device 210 includes a user interface 220, which may allow a user to control image capture functions and/or view images. The image capture device 210 includes a battery 222 for powering the image capture device 210. The components of the image capture device 210 may communicate with each other via the bus 224. The system 200 may be used to implement techniques described in this disclosure, such as the technique 300 of FIG. 3.

The processing apparatus 212 may include one or more processors having single or multiple processing cores. The processing apparatus 212 may include memory, such as random access memory device (RAM), flash memory, or any other suitable type of storage device such as a non-transitory computer readable memory. The memory of the processing apparatus 212 may include executable instructions and data that can be accessed by one or more processors of the processing apparatus 212. For example, the processing apparatus 212 may include one or more DRAM modules such as double data rate synchronous dynamic random-access memory (DDR SDRAM). In some implementations, the processing apparatus 212 may include a digital signal processor (DSP). In some implementations, the processing apparatus 212 may include an application specific integrated circuit (ASIC). For example, the processing apparatus 212 may include a custom image signal processor.

The first image sensor 214 and the second image sensor 216 are configured to detect light of a certain spectrum (e.g., the visible spectrum or the infrared spectrum) and convey information constituting an image as electrical signals (e.g., analog or digital signals). For example, the image sensors 214 and 216 may include charge-coupled devices (CCD) or active pixel sensors in complementary metal-oxide-semiconductor (CMOS). The image sensors 214 and 216 may detect light incident through respective lens (e.g., a fisheye lens). In some implementations, the image sensors 214 and 216 include digital to analog converters. In some implementations, the image sensors 214 and 216 are held in a fixed orientation with respective fields of view that overlap.

The image capture device 210 may include a communications interface 218, which may enable communications with a personal computing device (e.g., a smartphone, a tablet, a laptop computer, or a desktop computer). For example, the communications interface 218 may be used to receive commands controlling image capture and processing in the image capture device 210. For example, the communications interface 218 may be used to transfer image data to a personal computing device. For example, the communications interface 218 may include a wired interface, such as a high-definition multimedia interface (HDMI), a universal serial bus (USB) interface, or a FireWire interface. For example, the communications interface 218 may include a wireless interface, such as a Bluetooth interface, a ZigBee interface, and/or a Wi-Fi interface.

The image capture device 210 may include a user interface 220. For example, the user interface 220 may include an LCD display for presenting images and/or messages to a user. For example, the user interface 220 may include a button or switch enabling a person to manually turn the image capture device 210 on and off. For example, the user interface 220 may include a shutter button for snapping pictures.

The image capture device 210 may include a battery 222 that powers the image capture device 210 and/or its peripherals. For example, the battery 222 may be charged wirelessly or through a micro-USB interface.

FIG. 2B is a block diagram of an example system 230 configured for image capture and stitching. The system 230 includes an image capture device 240 and a personal computing device 260 that communicate via a communications link 250. The image capture device 240 includes a first image sensor 242 and a second image sensor 244 that are configured to capture respective images. The image capture device 240 includes a communications interface 246 configured to transfer images via the communication link 250 to the personal computing device 260. The personal computing device 260 includes a processing apparatus 262 that is configured to receive, using the communications interface 266, a first image from the first image sensor, and receive a second image from the second image sensor 244. The processing apparatus 262 may be configured to perform image signal processing (e.g., filtering, stitching, and/or encoding) to generated composite images based on image data from the image sensors 242 and 244. The system 230 may be used to implement techniques described in this disclosure, such as the technique 300 of FIG. 3.

The first image sensor 242 and the second image sensor 244 are configured to detect light of a certain spectrum (e.g., the visible spectrum or the infrared spectrum) and convey information constituting an image as electrical signals (e.g., analog or digital signals). For example, the image sensors 242 and 244 may include charge-coupled devices (CCD) or active pixel sensors in complementary metal-oxide-semiconductor (CMOS). The image sensors 242 and 244 may detect light incident through respective lens (e.g., a fisheye lens). In some implementations, the image sensors 242 and 244 include digital to analog converters. In some implementations, the image sensors 242 and 244 are held in a fixed relative orientation with respective fields of view that overlap. Image signals from the image sensors 242 and 244 may be passed to other components of the image capture device 240 via the bus 248.

The communications link 250 may be wired communications link or a wireless communications link. The communications interface 246 and the communications interface 266 may enable communications over the communications link 250. For example, the communications interface 246 and the communications interface 266 may include a high-definition multimedia interface (HDMI), a universal serial bus (USB) interface, a FireWire interface, a Bluetooth interface, a ZigBee interface, and/or a Wi-Fi interface. For example, the communications interface 246 and the communications interface 266 may be used to transfer image data from the image capture device 240 to the personal computing device 260 for image signal processing (e.g., filtering, stitching, and/or encoding) to generated composite images based on image data from the image sensors 242 and 244.

The processing apparatus 262 may include one or more processors having single or multiple processing cores. The processing apparatus 262 may include memory, such as random access memory device (RAM), flash memory, or any other suitable type of storage device such as a non-transitory computer readable memory. The memory of the processing apparatus 262 may include executable instructions and data that can be accessed by one or more processors of the processing apparatus 262. For example, the processing apparatus 262 may include one or more DRAM modules such as double data rate synchronous dynamic random-access memory (DDR SDRAM). In some implementations, the processing apparatus 262 may include a digital signal processor (DSP). In some implementations, the processing apparatus 262 may include an application specific integrated circuit (ASIC). For example, the processing apparatus 262 may include a custom image signal processor. The processing apparatus 262 may exchange data (e.g., image data) with other components of the personal computing device 260 via the bus 268.

The personal computing device 260 may include a user interface 264. For example, the user interface 264 may include a touchscreen display for presenting images and/or messages to a user and receiving commands from a user. For example, the user interface 264 may include a button or switch enabling a person to manually turn the personal computing device 260 on and off. In some implementations, commands (e.g., start recording video, stop recording video, or snap photograph) received via the user interface 264 may be passed on to the image capture device 240 via the communications link 250.

Figure 3:
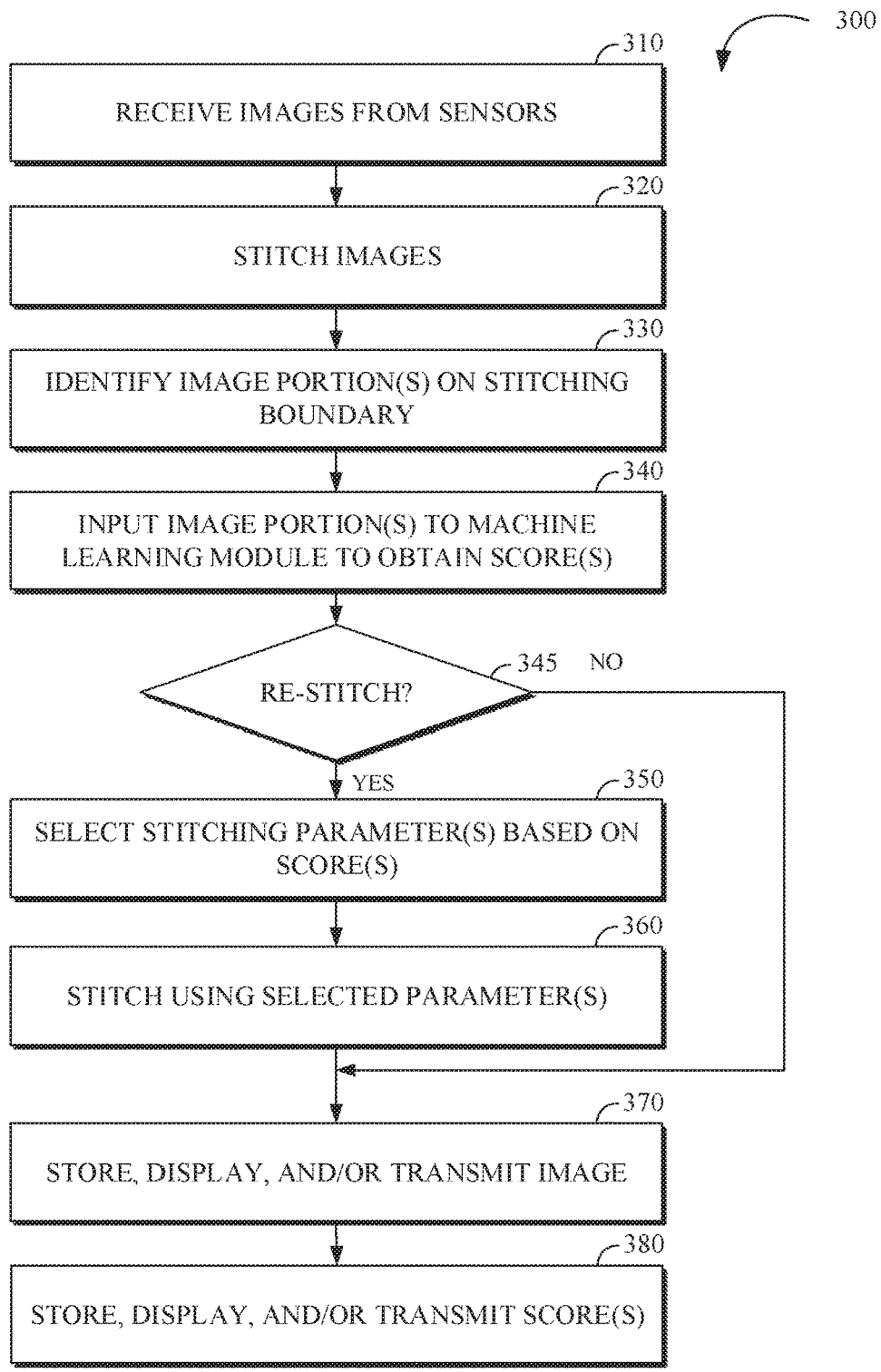
FIG. 3 is a flowchart of an example technique for image capture and stitching.

FIG. 3 is a flowchart of an example technique 300 for image capture and stitching. The example technique 300 includes receiving 310 image signals from two or more image sensors; stitching 320 the received images to obtain a composite image; identifying 330 one or more image portions that are positioned along a stitching boundary of the composite image; inputting 340 the image portion(s) to a machine learning module to obtain one or more scores; determining, based on the score(s), whether 345 to re-stitch; selecting 350 one or more parameters of a stitching algorithm based at least in part on the score(s); stitching (at operation 360), using the parameter(s), the received images to obtain a composite image; and storing, displaying, and/or transmitting at operation 370 transmit an output image based on the composite image. For example, the technique 300 may be implemented by the system 200 of FIG. 2A or the system 230 of FIG. 2B. For example, the technique 300 may be implemented by an image capture device, such the image capture device 210 shown in FIG. 2, or an image capture apparatus, such as the image capture apparatus 110 shown in FIG. 1. For example, the technique 300 may be implemented by a personal computing device, such as the personal computing device 260.

The images, including at least a first image from a first image sensor and a second image from a second image sensor, are received 310 from the image sensors. The image sensors may be part of an image capture apparatus (e.g., the image capture apparatus 110, the image capture device 210, or the image capture device 240) that holds the image sensors in a relative orientation such that the image sensors have partially overlapping fields of view. For example, the images may be received 310 from the sensors via a bus (e.g., the bus 224). In some implementations, the images may be received 310 via a communications link (e.g., the communications link 250). For example, the images may be received 310 via a wireless or wired communications interface (e.g., Wi-Fi, Bluetooth, USB, HDMI, Wireless USB, Near Field Communication (NFC), Ethernet, a radio frequency transceiver, and/or other interfaces). For example, the images may be received 310 via communications interface 266.

The example technique 300 includes stitching 320 the first image and the second image to obtain a stitched image. In some implementations, more than two images may be stitched 320 together (e.g., stitching together six images from the image sensors of the image capture apparatus 110 to obtain a spherical image). In some implementations, stitching 320 may include applying parallax correction (e.g., binocular disparity correction for a pair of images) for received images with overlapping fields of view to align the pixels from the images corresponding to objects appearing in multiple fields of view. For example, identifying the alignment for the images may include simultaneously optimizing the correspondence metrics and a smoothness criterion. For example, parallax correction may be applied in one dimension (e.g., parallel to an epipolar line between two image sensors) or in two dimensions. In some implementations, stitching 320 may include applying color correction to better match the pixels of the received images (e.g., to reduce color differences due to variations in the image sensors and respective lens and/or exposure times). In some implementations, stitching can include blending (e.g., averaging pixel values) pixels from the images being combined within a region along a stitching boundary. For example, blending may smooth the transition across a stitching boundary to make differences less noticeable and improve image quality. For example, stitching 320 may be implemented by a processing apparatus (e.g., the processing apparatus 212 or the processing apparatus 262).

The example technique 300 includes identifying 330 an image portion of the stitched image that is positioned on a stitching boundary of the stitched image. For example, the image portion may be a block (e.g., an 8×8 block) of pixels from the stitched image that includes pixels based at least in part on pixels from the first image and includes pixels based at least in part on pixels from the second image. For example, the image portion may be a block that extends the length of the seam (e.g., an 1920×8 block for full resolution 1080p video frames) between two images being stitched. In some implementations, one or more additional image portions are identified 330 within the stitched image that occur along the stitching boundary of the stitched image. For example, a stitching seam may be segmented into an array of small image portions (e.g., 8×8 blocks of pixels). For example, image portions may be identified as described in relation to FIG. 6. Because pixel alignment varies with factors such as the distances of objects appearing in both of the overlapping fields of view, the component of the image coordinates perpendicular to the stitching boundary may vary slightly along the length of the stitching boundary. Identifying 330 the image portions may include analyzing parallax correction results from the stitching 320 operation to determine the coordinates of the stitching boundary in a particular region of the stitched image.

In some implementations, the stitched image is downsampled when extracting the image portion(s), such that the image portions have a lower resolution than the full resolution stitched image. For example, the image portion may be a block of pixels from the stitched image that includes pixels on both sides of the stitching boundary, where the block of pixels has a resolution less than the resolution of the first image. For example, the image portion(s) may be identified 330 by a processing apparatus (e.g., the processing apparatus 212 or the processing apparatus 262).

The example technique 300 includes inputting 340 the image portion(s) to a machine learning module (e.g., including a neural network, a support vector machine, a decision tree, or a Bayesian network) to obtain a score. The score may be indicative of the quality of the stitching in the image portion from along the stitching boundary. To accomplish this, the machine learning module may be trained to recognize the presence or absence of stitching and its associated artifacts and distortion in image portions (e.g., blocks of pixels) from seams. For example, the machine learning module may have been trained using training data that included image portions labeled to reflect an absence of stitching and image portions labeled to reflect a presence of stitching. The image portions labeled to reflect a presence of stitching may have included stitching boundaries of stitched images. For example, the machine learning module may have been trained using the technique 400 of FIG. 4. In some implementations, the machine learning module may be trained during a design phase of an image capture system and the resulting trained machine learning module may be stored in memory of a processing apparatus implementing the technique 300.

In some implementations, the machine learning module includes a neural network (e.g., convolutional neural network). For example, the machine learning module may include a neural network that receives pixel values from pixels in the image portion and outputs the score. For example, the machine learning module 710 of FIG. 7A may be employed. In some implementations, the machine learning module may include a support vector machine. For example, the machine learning module 760 of FIG. 7B may be employed.

In some implementations, one or more additional image portions are input 340 to the machine learning module to obtain one or more additional scores. For example, where a seam has been segmented into an array of image portions, multiple image portions from along a seam may be input 340 to the machine learning module to obtain an array of scores. A histogram of the score and the one or more additional scores may be generated. For example, an array of scores (e.g., from along a seam or from along the seams of a sequence of frames of video) may be used to generate a histogram of the scores. A histogram may be used to assess the quality of a stitching algorithm over a variety of scenes. In some implementations, a composite score may be determined based on a collection of scores for individual image portions. For example, the scores for an array of image portions from a seam or set of seams in a stitched image may be averaged to determine a stitching quality score for the stitched image as a whole. For example, scores may be averaged across multiple images (e.g., a sequence of frames of video) to determine a composite score relating to stitching quality.

For example, the image portion(s) may be input 340 to the machine learning module by a processing apparatus (e.g., the processing apparatus 212 or the processing apparatus 262).

The score(s) obtained using the machine learning module may be analyzed to determine whether (at operation 345) the stitched image is good enough or should be re-stitched using adjusted parameters for a stitching algorithm. For example, the score(s) or a composite score may be compared to a threshold to determine whether re-stitching should be performed.

The example technique 300 includes selecting 350 a parameter based on the score(s) obtained from the machine learning module. In some implementations, the selected parameter specifies whether one dimensional parallax correction or two dimensional parallax correction will be applied to stich the first image and the second image. For example, one dimensional parallax correction may be applied initially at stitching operation 320 and, where the score(s) from the machine learning module are in a particular range (e.g., exceeding a threshold), a two dimensional parallax correction (which may have a higher computational complexity) may be selected 350 and applied to stitch the received images at operation 360. In some implementations, the selected parameter specifies a resolution at which the stitching analysis will be performed. In some implementations, the selected parameter is a weight that specifies the relative importance of a correspondence metric versus a smoothness criterion in cost function that is optimized as part of a parallax correction algorithm. For example, the weight may be chosen to proportional or inversely proportional to the score from the machine learning module or a composite score based on scores from the machine learning module. For example, a stitching parameter may be selected 350 by a processing apparatus (e.g., the processing apparatus 212 or the processing apparatus 262).

When the stitching is finalized, the resulting composite image (e.g., a panoramic or spherical image) may be subject to additional image processing (e.g., output projection mapping and/or encoding in a compressed format) to generate an output image (e.g., a still image or frame of video). In some implementations, the composite image may be the final output image (i.e., no further processing is needed). The output image may then be stored, displayed, and/or transmitted at operation 370. For example, the output image may be transmitted to an external device (e.g., a personal computing device) for display or storage. For example, the output image may be displayed in the user interface 220 or in the user interface 264. For example, the output image may be transmitted via the communications interface 218.

In some implementations, the score(s) or a composite score based on the scores from the machine learning module may be stored, displayed, and/or transmitted at operation 380. For example, the scores may be logged to track performance of stitching algorithms over time as they encounter a diversity of scenes. For example, the score(s) may be transmitted to an external device (e.g., a personal computing device) for display or storage. For example, the score(s) may be displayed in user interface 220 or in user interface 264. For example, the score(s) may be transmitted via the communications interface 218.

Figure 4:
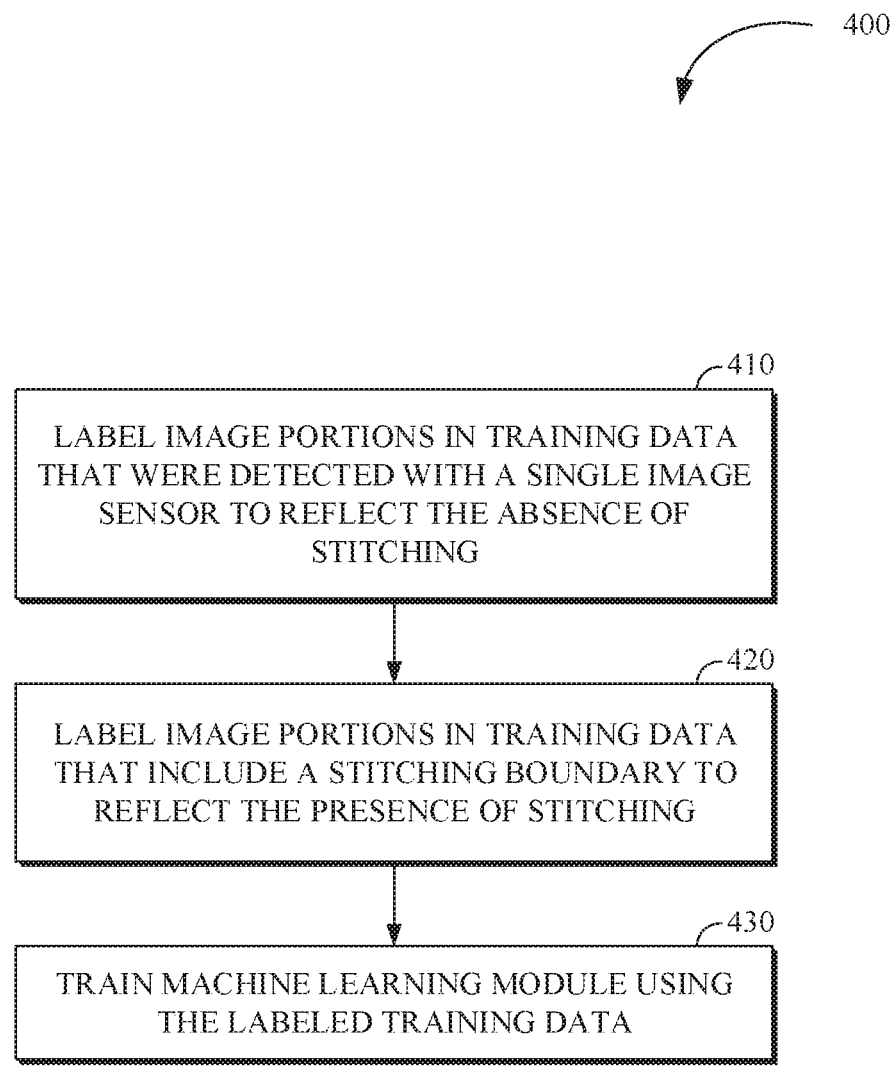
FIG. 4 is a flowchart of an example technique for training a machine learning module to enable evaluation of image stitching quality.

FIG. 4 is a flowchart of an example technique 400 for training a machine learning module to enable evaluation of image stitching quality. The technique 400 includes labeling 410 image portions detected with a single image sensor to reflect the absence of stitching; labeling 420 image portions in training data that include a stitching boundary to reflect the presence of stitching; and training 430 the machine learning module using the labeled training data. For example, the technique 400 may be implemented by the system 200 of FIG. 2A or the system 230 of FIG. 2B. For example, the technique 400 may be implemented by an image capture device, such the image capture device 210 shown in FIG. 2, or an image capture apparatus, such as the image capture apparatus 110 shown in FIG. 1. For example, the technique 400 may be implemented by a personal computing device, such as the personal computing device 260.

The training data includes image portions detected with a single image sensor that are labeled 410 to reflect an absence of stitching. The training data also includes image portions that include a stitching boundary and that are labeled 420 to reflect a presence of stitching. In some implementations, the labels for this training data are binary. For example, the image portions without stitching may be labeled with a zero to reflect the absence of stitching, while image portions that include stitching are labeled with a one to reflect the presence of stitching.

The image portions in the training data should match the size of image portions that will be assessed by the machine learning module. For example, the image portions labeled to reflect the presence of stitching may be identified from images available for training in a manner discussed in relation to operation 330 of FIG. 3 and/or FIG. 6. The image portions labeled to reflect the absence of stitching will be of the same size, but taken from regions of an image far from any seam or from images without seams.

The machine learning module (e.g., including a neural network, a support vector machine, a decision tree, or a Bayesian network) is trained 430 using the labeled training data. For example, the machine learning module 710 or the machine learning module 760 may be trained 430 using the labeled training data. The resulting trained machine learning module may be used to assess image quality of image portions of corresponding size from stitched images in an image capture system (e.g., using the technique 300 of FIG. 3).

Figure 5:
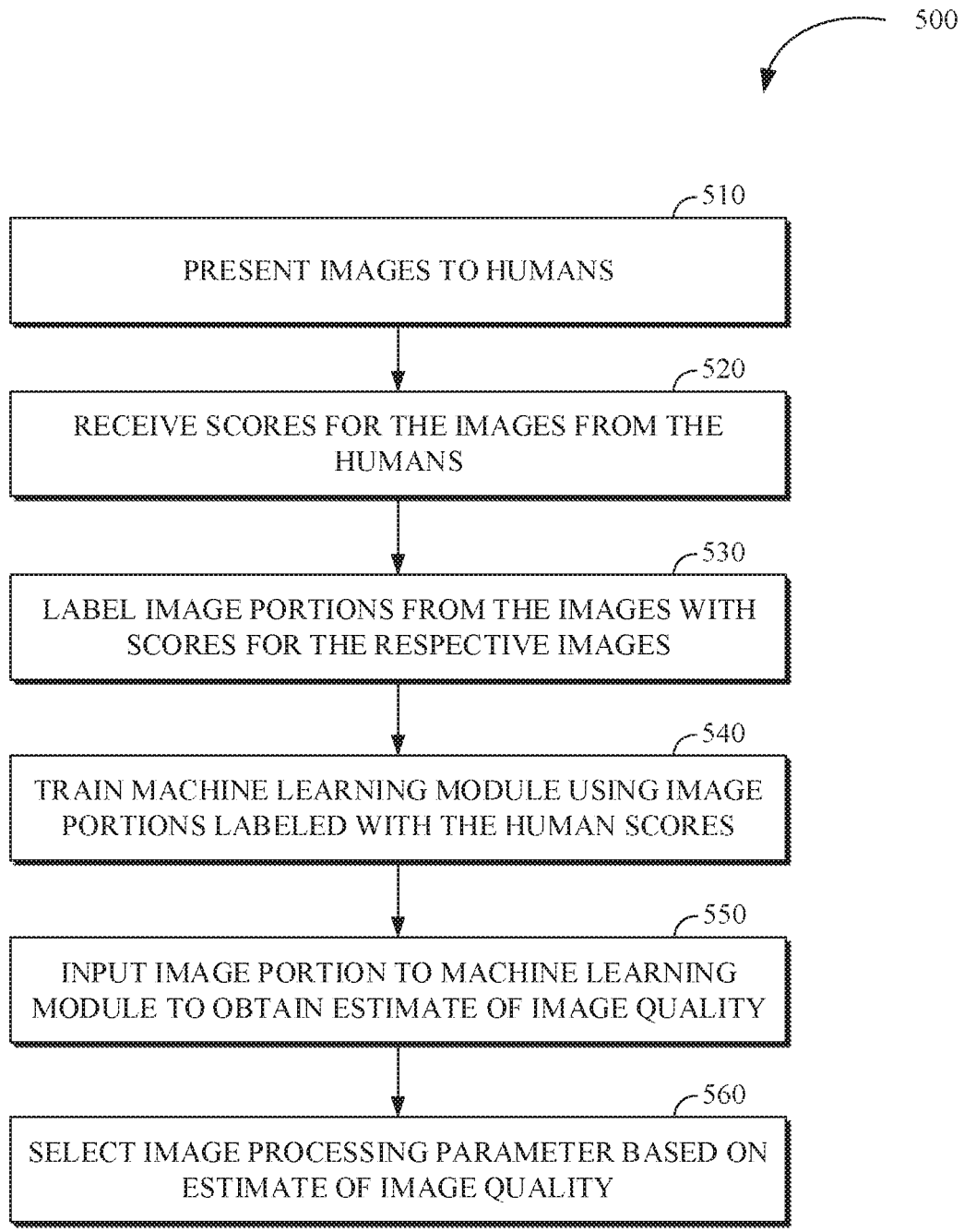
FIG. 5 is a flowchart of an example technique for training a machine learning module to estimate subjective image quality.

FIG. 5 is a flowchart of an example technique 500 for training a machine learning module to estimate subjective image quality. The technique 500 includes presenting 510 images to humans; receiving 520 scores for the images from the humans; training 540 a machine learning module with training data that includes image portions from the images labeled 530 with the scores for the images from the humans; inputting 550 an image portion from a first image to the trained machine learning module to obtain an estimate of quality of the first image; and selecting 560 a parameter of an image processing algorithm based on the estimate of quality of the first image. For example, the technique 500 may be implemented by the system 200 of FIG. 2A or the system 230 of FIG. 2B. For example, the technique 500 may be implemented by an image capture device, such the image capture device 210 shown in FIG. 2, or an image capture apparatus, such as the image capture apparatus 110 shown in FIG. 1. For example, the technique 500 may be implemented by a personal computing device, such as the personal computing device 260.

In some implementations, the technique 500 is employed in a laboratory using a system of computing devices to gather the subjective scores from humans, train 540 a machine learning module, and use the trained machine learning module to provide feedback for selecting 560 parameters of image processing algorithms under development.

The example technique 500 includes presenting 510 images to humans. For example, images may be displayed in a user interface (e.g., the user interface 264) to a human, and the human may be prompted to input a subjective image quality score for the image in response. For example, the score may be on a scale of 1 to 10 or mapped from text descriptions (e.g., "excellent," "good," "fair," "poor," "bad") of quality selected by a user. In some implementations, a large number (e.g., a statistically significant number) of humans are presented with the images to solicit their subjective scores of image quality for the images from which a training data set will be determined. For example, the scores from many humans for a particular image may be averaged or otherwise combined to determine a subjective quality score for that image.

The scores received 520 from the humans may be used to label 530 image portions from their respective images. For example, a stitching seam may be segmented into an array of image portions (e.g., blocks of pixels) and the image portions may be labeled 530 with a subjective score for the image in which the seam occurs.

The example technique 500 includes training 540 the machine learning module, wherein the training data includes image portions labeled with subjective scores provided by humans for images from which the image portions are taken. For example, image portions from a seam in a stitched image that are labeled with the subjective score for that stitched image may be used to train 540 a machine learning module.

The trained machine learning module may then be utilized to approximate subjective image quality scores for new images. For example, portions of new images produced with an image processing algorithm under development (e.g., a noise reduction algorithm, a warp algorithm, a stitching algorithm, a compression algorithm, etc.) may be input 550 to the trained machine learning module to obtain estimates of subjective image quality. These estimates of subjective image quality may provide feedback to facilitate the selection 560 of one or more parameters of the image processing algorithm under consideration.

In some implementations, the trained machine learning module may then be utilized to provide scores as feedback for selecting 560 a parameter of an image processing algorithm (e.g., a noise reduction algorithm, a warp algorithm, a stitching algorithm, a compression algorithm, etc.) in real-time, during the image capture process, to adapt to changing conditions of the scene being recorded.

Figure 6:
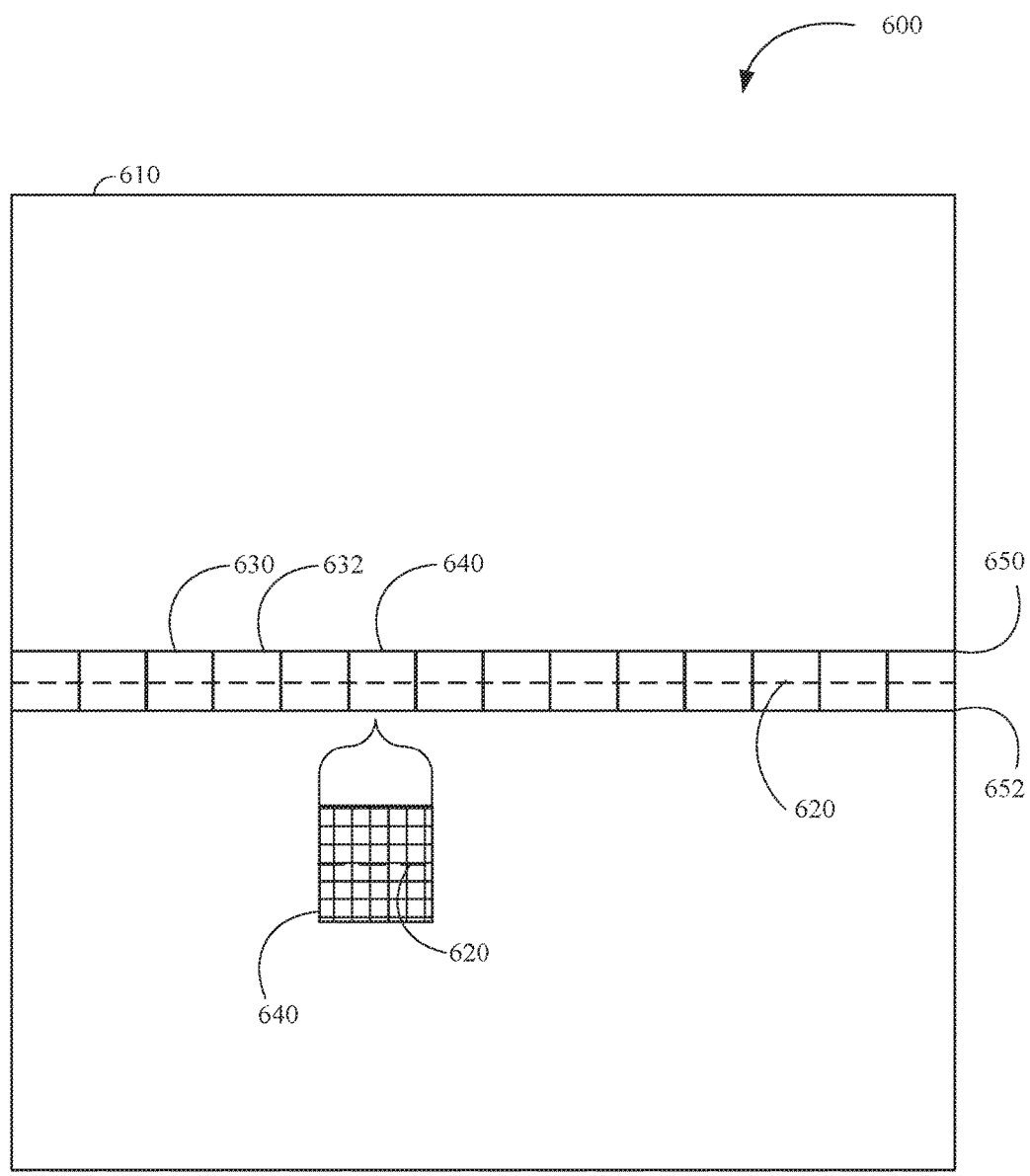
FIG. 6 is shows an example layout of a stitched image.

FIG. 6 is shows an example layout 600 of a stitched image 610. The stitched image 610 includes pixels from two images—a top image that is above the stitching boundary 620 and a bottom image that is below the stitching boundary 620. The seam of the stitched image has been segmented into an array of image portions, including image portions 630 and 632. An enlarged view of image portion 640 is shown. Image portion 640, like the other image portions in the array is, is an 8×8 block of pixels that includes pixels on both sides of the stitching boundary 620.

The image portions (e.g., image portions 630, 632, and 640) may be sampled at resolution less than the resolution of the full resolution version of the stitched image 610. For example, the image portions (e.g., image portions 630, 632, and 640) may be sampled at one quarter or one eighth of the full resolution.

In some implementations, operations to obtain a stitched image include a blending operation on the pixels from the top image and the bottom image in a region near the stitching boundary. For example, the pixel values may be calculated as $$\text{P\_composite} = b * \text{P\_bottom} + (1-b) * \text{P\_top}, \quad \text{(Eqn. 1)}$$

where P_composite is a pixel value in the composite image, P_bottom is a corresponding pixel value from the bottom image, P_top is a corresponding pixel value from the top image, and b is a blending ratio that varies vertically across a blending region along the stitching boundary. For example, b may be 1 below a bottom edge of the blending region, b may be at or near 0.5 for pixels right at the stitching boundary, and b may decease to zero at a top edge of the blending region. Operation of blending pixels from the top image and the bottom image (e.g., such as described by Eqn. 1) may be referred to as a weighted average. In some implementations, a blending operation may be effectuated using one or more pixel masks. By way of an illustration, a mask may include an array of values, wherein a value of 1 may be used to select a pixel at a corresponding location from the top image; a value of 0 may be used to select a pixel from the bottom image; and a value between 0 and 1 may be used to average or blend pixels from the top and bottom images. The mask array may be configured based on dimensions of a blending region, for example, having a width (in number of pixels) equal to the length of the stitching boundary and a height (in number of pixels) equal thickness of the blending region. In general, the blending region need not correspond exactly to extent of the seam or the image portions. passed to a machine learning module. For example, the thickness of the blending region may be less than the thickness of the seam. In the example stitched image 610, the blending region coincides with the image portions from the seam that extend from an upper boundary 650 to a lower boundary 652. The height of the blending region in this example is the distance (in number of pixels) between the upper boundary 650 and the lower boundary 652 (i.e., 8 pixels in this example).

Figure 7:
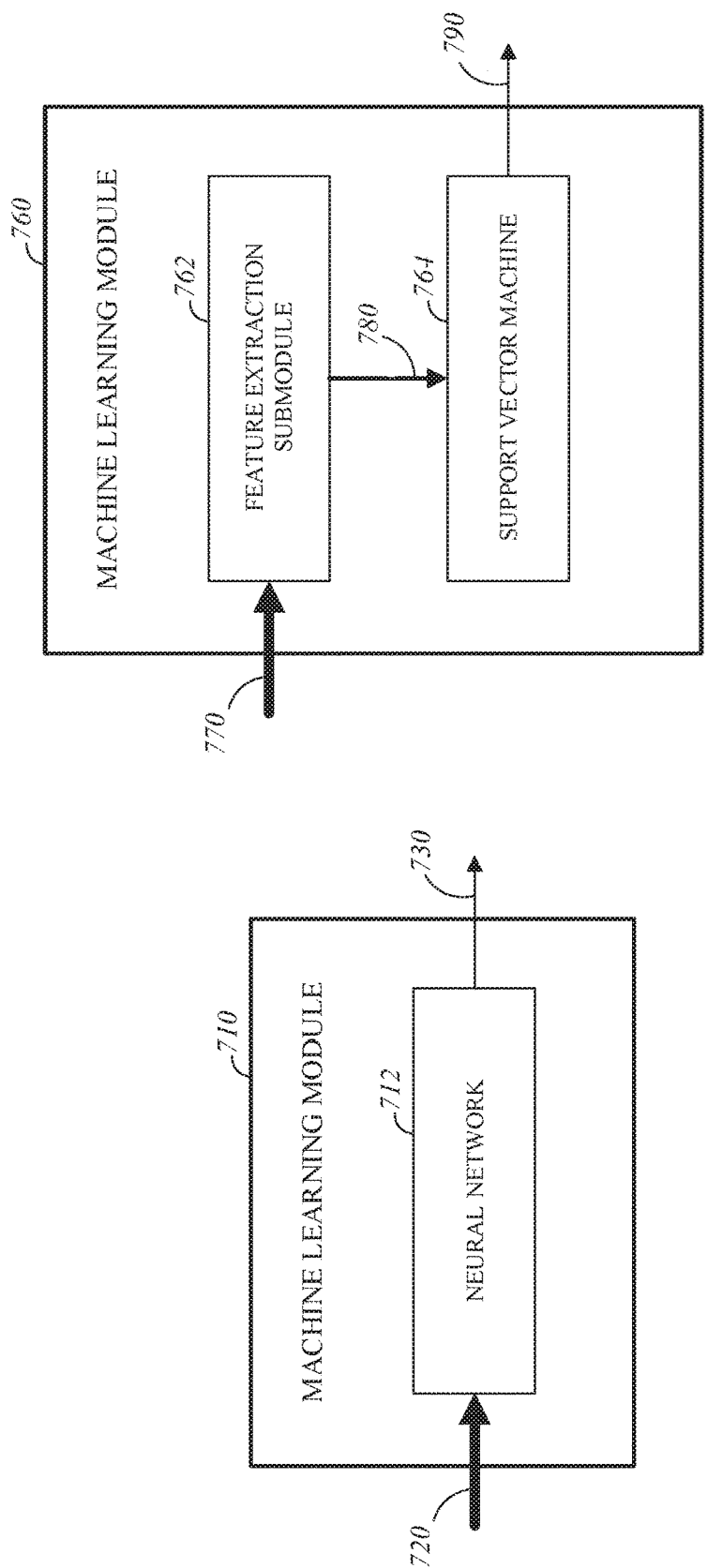
FIG. 7A is a block diagram of an example machine learning module configured for image quality assessment.
FIG. 7B is a block diagram of an example machine learning module configured for image quality assessment.

FIG. 7A is a block diagram of an example machine learning module 710 configured for image quality assessment. The machine learning module 710 includes a convolutional neural network 712. The machine learning module 710 takes image portions (e.g., 8×8 blocks of pixels) as input 720 and passes the pixel values for the image portion to a first layer of the neural network 712. For example, where the input 720 is an 8×8 block of color pixels, an array of 192 color values for the 64 pixels may be passed into the neural network 712 as input. The neural network 712 then produces a score as output 730 in response to the input 720. This score may be indicative of image quality (e.g., stitching quality) of the image potion that was passed in as input 720.

For example, an image portion that is input 720 may be a block of pixels from a stitched image that includes pixels on both sides of a stitching boundary and all pixel values from the block of pixels may be input to a first layer of the neural network 712. In this manner, an output 730 that is indicative of the stitching quality in the image portion may be obtained.

In some implementations, the image quality assessment may be applied to greyscale images (e.g., just considering a luminance component of an image) or to mosaiced color images that have not been demosaiced to interpolate the colors, such that 8×8 block of pixels may be passed in as an array of 64 pixel values. These implementations, may reduce the complexity of the machine learning module and allow for training with smaller data sets.

In some implementations, the convolutional neural network 712 includes eleven layers in the sequence: 2-D convolution layer, activation layer, 2-D convolution layer, activation layer, dropout layer, flatten layer, dense layer, activation layer, dropout layer, dense layer, activation layer. In some implementations, information about the position of a stitching boundary within the image portion may be preserved by omitting pooling layers from the neural network. For example, the neural network 712 may be implemented using the keras.io library with the structure provided in appendix A.

FIG. 7B is a block diagram of an example machine learning module 760 configured for image quality assessment. The machine learning module 760 comprises a feature extraction submodule 762 that is configured to determine features 780 based on an image portion passed in as input 770. In some implementations, the features 780 include high frequency components of color channel signals of the image portion. For example, the feature extraction submodule 762 may apply high-pass filtering to determine the features 780. In some implementations, the feature extraction submodule 762 is configured to apply an edge detector to determine one or more of the features 780. The extracted features 780 are then passed to a support vector machine module 764 to generate scores that are provided as output 790 of the machine learning module 760.

Figure 8:
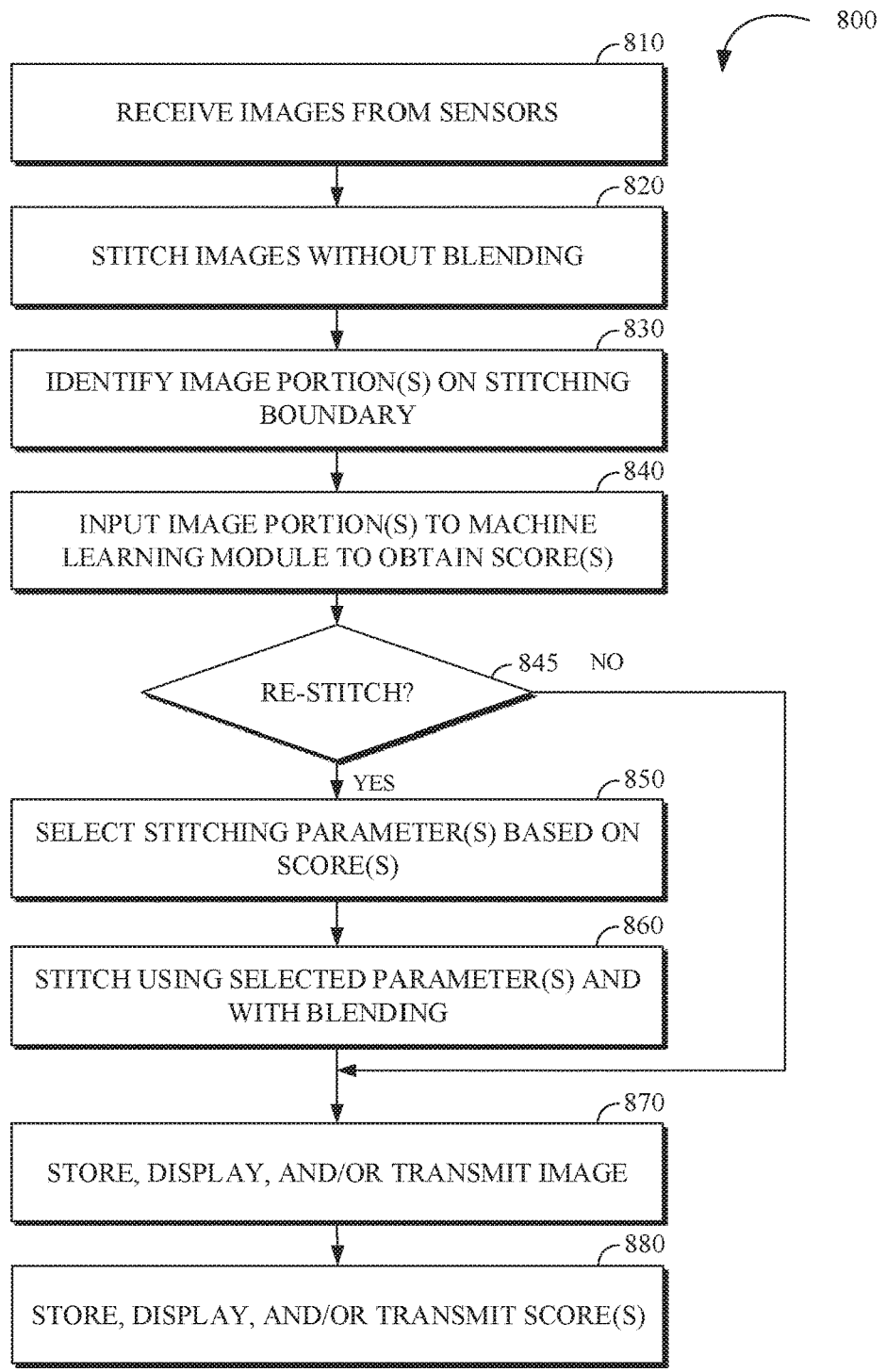
FIG. 8 is a flowchart of an example technique for image capture and stitching.

FIG. 8 is a flowchart of an example technique 800 for image capture and stitching. The technique 800 is an example of the technique 400 that specifies a manner of utilizing blending in the stitching operations. In some implementations, stitching images may include steps: (1) correcting disparity or parallax between the input images to achieve a good correspondence along the stitching boundary, and (2) blending images in the overlap region (e.g., the seam) to mask imperfections of the disparity/parallax correction.

For example, blending may consist of taking a weighted average of the input images, where the weight smoothly varies with the distance to the stitching boundary. For example, the weight may be a linear function of the distance to the stitching boundary, so that at a certain distance (e.g., 20 pixels) inside a first input image, the weight is 1 for the first input image and 0 for second input image; at or near the stitching boundary weights may be 50% for both input images; and at a certain distance (e.g., 20 pixels) inside the second input image, the weight is 0 for the first input image and 1 for the second input image.

Although it is preferable to have a good disparity correction, when such a good correction is not found by the disparity correction step, the blending step mitigates the degradation of image quality by preventing the resulting image from showing an abrupt content change, which can be very well detected by a human eye, but rather a fuzzy area, which while noticeable and undesirable, can be much more acceptable to the human eye. However, blending also can make stitching boundaries significantly more difficult to detect for a machine learning module used to evaluating the quality of the stitching, making a stitching quality assessment system less sensitive to disparity correction errors.

One example solution is to present to the machine learning module a non-blended stitched image, where content of the input images are abruptly stitched together, so that it is easier for the machine learning module to evaluate the quality of the disparity or parallax correction. This way, parameters or algorithm details of the disparity correction module can be more easily adjusted. In some implementations, the non-blended stitched image is computed for the machine learning module, while the final output image shown to the user is smoothly blended stitched image. This selective use of blending may facilitate adjustment of disparity or parallax correction parameters while smoothing over disparity correction errors and other distortions in a composite image that may be output for viewing.

The example technique 800 includes receiving 810 image signals from two or more image sensors; stitching 820 without blending the received images to obtain a composite image; identifying 830 one or more image portions that are positioned along a stitching boundary of the composite image; inputting 840 the image portion(s) to a machine learning module to obtain one or more scores; determining, based on the score(s), whether 845 to re-stitch; selecting 850 one or more parameters of a stitching algorithm based at least in part on the score(s); stitching (at operation 860), using the parameter(s) and with blending, the received images to obtain a composite image; and storing, displaying, and/or transmitting at operation 870 transmit an output image based on the composite image. For example, the technique 800 may be implemented by the system 200 of FIG. 2A or the system 230 of FIG. 2B. For example, the technique 800 may be implemented by an image capture device, such the image capture device 210 shown in FIG. 2, or an image capture apparatus, such as the image capture apparatus 110 shown in FIG. 1. For example, the technique 800 may be implemented by a personal computing device, such as the personal computing device 260.

The images, including at least a first image from a first image sensor and a second image from a second image sensor, are received 810 from the image sensors. The images may be received 810 as described in relation to operation 310 of FIG. 3.

The example technique 800 includes stitching 820 without blending the first image and the second image to obtain a stitched image. For example, stitching 820 to obtain the stitched image is performed without blending, such that individual pixels of the stitched image are respectively based on either the first image or the second image, but not both. In some implementations, more than two images may be stitched 820 together (e.g., stitching together six images from the image sensors of the image capture apparatus 110 to obtain a spherical image). In some implementations, stitching 820 may include applying parallax correction (e.g., binocular disparity correction for a pair of images) for received images with overlapping fields of view to align the pixels from the images corresponding to objects appearing in multiple fields of view. For example, identifying the alignment for the images may include simultaneously optimizing the correspondence metrics and a smoothness criterion. For example, parallax correction may be applied in one dimension (e.g., parallel to an epipolar line between two image sensors) or in two dimensions. In some implementations, stitching 820 may include applying color correction to better match the pixels of the received images (e.g., to reduce color differences due to variations in the image sensors and respective lens and/or exposure times). For example, stitching 820 may be implemented by a processing apparatus (e.g., the processing apparatus 212 or the processing apparatus 262).

The example technique 800 includes identifying 830 an image portion of the stitched image that is positioned on a stitching boundary of the stitched image. For example, the image portion may be identified 830 as described in relation to operation 330 of FIG. 3.

The example technique 800 includes inputting 840 the image portion(s) to a machine learning module (e.g., including a neural network, a support vector machine, a decision tree, or a Bayesian network) to obtain a score. The score may be indicative of the quality of the stitching in the image portion from along the stitching boundary. To accomplish this, the machine learning module may be trained to recognize the presence or absence of stitching and its associated artifacts and distortion in image portions (e.g., blocks of pixels) from seams. For example, the machine learning module may have been trained using training data that included image portions labeled to reflect an absence of stitching and image portions labeled to reflect a presence of stitching. The image portions labeled to reflect a presence of stitching may have included stitching boundaries of stitched images. For example, the image portions of the training data labeled to reflect a presence of stitching may have included stitching boundaries of stitched images that were stitched without blending. For example, the machine learning module may have been trained using the technique 400 of FIG. 4. In some implementations, the machine learning module may be trained during a design phase of an image capture system and the resulting trained machine learning module may be stored in memory of a processing apparatus implementing the technique 800.

In some implementations, the machine learning module includes a neural network (e.g., convolutional neural network). For example, the machine learning module may include a neural network that receives pixel values from pixels in the image portion and outputs the score. For example, the machine learning module 710 of FIG. 7A may be employed. In some implementations, the machine learning module may include a support vector machine. For example, the machine learning module 760 of FIG. 7B may be employed.

In some implementations, one or more additional image portions are input 840 to the machine learning module to obtain one or more additional scores. For example, where a seam has been segmented into an array of image portions, multiple image portions from along a seam may be input 840 to the machine learning module to obtain an array of scores. A histogram of the score and the one or more additional scores may be generated. For example, an array of scores (e.g., from along a seam or from along the seams of a sequence of frames of video) may be used to generate a histogram of the scores. A histogram may be used to assess the quality of a stitching algorithm over a variety of scenes. In some implementations, a composite score may be determined based on a collection of scores for individual image portions. For example, the scores for an array of image portions from a seam or set of seams in a stitched image may be averaged to determine a stitching quality score for the stitched image as a whole. For example, scores may be averaged across multiple images (e.g., a sequence of frames of video) to determine a composite score relating to stitching quality.

For example, the image portion(s) may be input 840 to the machine learning module by a processing apparatus (e.g., the processing apparatus 212 or the processing apparatus 262).

The score(s) obtained using the machine learning module may be analyzed to determine whether (at operation 845) the stitched image is good enough or should be re-stitched using adjusted parameters for a stitching algorithm. For example, the score(s) or a composite score may be compared to a threshold to determine whether re-stitching should be performed.

The example technique 800 includes selecting 850 a parameter based on the score(s) obtained from the machine learning module. In some implementations, the selected parameter specifies whether one dimensional parallax correction or two dimensional parallax correction will be applied to stich the first image and the second image. For example, one dimensional parallax correction may be applied initially at stitching operation 820 and, where the score(s) from the machine learning module are in a particular range (e.g., exceeding a threshold), a two dimensional parallax correction (which may have a higher computational complexity) may be selected 850 and applied to stitch, with blending, the received images at operation 860. For example, stitching 860 to obtain a composite image is performed with blending, such that at least one pixel of the composite image is based on both the first image and the second image. In some implementations, the selected parameter specifies a resolution at which the stitching analysis will be performed. In some implementations, the selected parameter is a weight that specifies the relative importance of a correspondence metric versus a smoothness criterion in cost function that is optimized as part of a parallax correction algorithm. For example, the weight may be chosen to proportional or inversely proportional to the score from the machine learning module or a composite score based on scores from the machine learning module. For example, a stitching parameter may be selected 850 by a processing apparatus (e.g., the processing apparatus 212 or the processing apparatus 262).

When the stitching is finalized, the resulting composite image (e.g., a panoramic or spherical image) may be subject to additional image processing (e.g., output projection mapping and/or encoding in a compressed format) to generate an output image (e.g., a still image or frame of video). In some implementations, the composite image may be the final output image (i.e., no further processing is needed). The output image may then be stored, displayed, and/or transmitted at operation 870 (e.g., as described in relation to operation 370 of FIG. 3). In some implementations, the score(s) or a composite score based on the scores from the machine learning module may be stored, displayed, and/or transmitted at operation 880 (e.g., as described in relation to operation 380 of FIG. 3).

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

APPENDIX A

| Layer (type) | Output Shape | Param # | Connected to |
| --- | --- | --- | --- |
| convolution2d_1 (Convolution2D) | (None, 8, 8, 16) | 448 | convolution2d_input_1[0][0] |
| activation_1 (Activation) | (None, 8, 8, 16) | 0 | convolution2d_1[0][0] |
| convolution2d_2 (Convolution2D) | (None, 6, 6, 16) | 2320 | activation_1[0][0] |
| activation_2 (Activation) | (None, 6, 6, 16) | 0 | convolution2d_2[0][0] |
| dropout_1 (Dropout) | (None, 6, 6, 16) | 0 | activation_2[0][0] |
| flatten_1 (Flatten) | (None, 576) | 0 | dropout_1[0][0] |
| dense_1 (Dense) | (None, 64) | 36928 | flatten_1[0][0] |
| activation_3 (Activation) | (None, 64) | 0 | dense_1[0][0] |
| dropout_2 (Dropout) | (None, 64) | 0 | activation_3[0][0] |
| dense_2 (Dense) | (None, 2) | 130 | dropout_2[0][0] |
| activation_4 (Activation) | (None, 2) | 0 | dense_2[0][0] |

Total params: 39826

What is claimed is:

1. A system comprising:
a first image sensor configured to capture a first image;
a second image sensor configured to capture a second image; and
a processing apparatus that is configured to:
receive the first image from the first image sensor;
receive the second image from the second image sensor;
stitch the first image and the second image to obtain a stitched image;
identify an image portion of the stitched image that is positioned on a stitching boundary of the stitched image;
input the image portion to a machine learning module to obtain a score, wherein the machine learning module has been trained using training data that included image portions labeled to reflect an absence of stitching and image portions labeled to reflect a presence of stitching, wherein the image portions labeled to reflect a presence of stitching included stitching boundaries of stitched images;
select a parameter of a stitching algorithm based at least in part on the score;
determining whether to re-stitch based on the score and a threshold;
responsive to determination, re-stitching, using the parameter, the first image and the second image to obtain a composite image; and
store, display, or transmit an output image based on the composite image.

2. The system of claim 1, in which the processing apparatus is configured to:
identify one or more additional image portions within the stitched image that occur along the stitching boundary of the stitched image;
input the one or more additional image portions to the machine learning module to obtain one or more additional scores; and
select the parameter based on the one or more additional scores.

3. The system of claim 1, in which the machine learning module comprises a feature extraction submodule that is configured to determine features based on the image portion.

4. The system of claim 1, in which stitching to obtain the stitched image is performed such that individual pixels of the stitched image are respectively based on either the first image or the second image, but not both; and
in which stitching to obtain the composite image is performed such that at least one pixel of the composite image is based on both the first image and the second image.

5. The system of claim 1, in which stitching to obtain the stitched image is performed such that individual pixels of the stitched image are respectively based on either the first image or the second image, but not both; and
in which the image portions of the training data labeled to reflect a presence of stitching included stitching boundaries of stitched images that were stitched without blending.

6. The system of claim 1, in which the parameter specifies whether one dimensional parallax correction or two dimensional parallax correction will be applied to stich the first image and the second image.

7. The system of claim 1, in which the image portion is a block of pixels from the stitched image that includes pixels on both sides of the stitching boundary, where the block of pixels has a resolution less than the resolution of the first image.

8. The system of claim 1, in which the machine learning module includes a convolutional neural network.

9. The system of claim 1, in which the machine learning module includes a neural network and the image portion is a block of pixels from the stitched image that includes pixels on both sides of the stitching boundary and all pixel values from the block of pixels are input to a first layer of the neural network.

10. A method comprising:
receiving a first image from a first image sensor;
receiving a second image from a second image sensor;
stitching the first image and the second image to obtain a stitched image;
identifying an image portion of the stitched image that is positioned on a stitching boundary of the stitched image; and
inputting the image portion to a machine learning module to obtain a score, wherein the machine learning module has been trained using training data that included image portions labeled to reflect an absence of stitching and image portions labeled to reflect a presence of stitching, wherein the image portions labeled to reflect a presence of stitching included stitching boundaries of stitched images;
select a parameter of a stitching algorithm based at least in part of the score;
determining whether to re-stitch based on the score and a threshold;
responsive to determination, re-stitching, using the parameter, the first image and the second image to obtain a composite image;
and store, display, or transmit an output image based on the composite image.

11. The method of claim 10, comprising:
storing, displaying, or transmitting the score or a composite score based in part on the score.

12. The method of claim 10, comprising:
identifying one or more additional image portions within the stitched image that occur along the stitching boundary of the stitched image;
inputting the one or more additional image portions to the machine learning module to obtain one or more additional scores; and
generating a histogram of the score and the one or more additional scores.

13. The method of claim 10, comprising:
training the machine learning module, wherein the training data includes image portions detected with a single image sensor that are labeled to reflect an absence of stitching.

14. The method of claim 10, comprising:
training the machine learning module, wherein the training data includes image portions labeled with subjective scores provided by humans for images from which the image portions are taken.

15. The method of claim 10, comprising:
selecting a parameter of a stitching algorithm based on the score.

16. The method of claim 10, in which the image portion is a block of pixels from the stitched image that includes pixels on both sides of the stitching boundary, where the block of pixels has a resolution less than the resolution of the first image.

17. The method of claim 10, in which the machine learning module includes a neural network that receives pixel values from pixels in the image portion and outputs the score.

18. The method of claim 10, comprising:
obtaining a plurality of scores from the machine learning module for a plurality of image portions from along the stitching boundary of the stitched image; and
determining a composite score for the stitched image based on the plurality of scores.

* * * * *